United States Patent [19]

Bopp et al.

[11] 4,022,509
[45] May 10, 1977

[54] LOCKING PIN ACTUATOR MEANS FOR A TILT CAB VEHICLE

[75] Inventors: Robert D. Bopp; David P. Klosterman, both of Moberly, Mo.

[73] Assignee: Orscheln Brake Lever Mfg. Company, Moberly, Mo.

[22] Filed: Dec. 1, 1975

[21] Appl. No.: 636,420

[52] U.S. Cl. ............................ 296/28 C; 292/144
[51] Int. Cl.² ..................... E05C 1/06; B62D 27/06
[58] Field of Search ...................... 296/28 C, 35 R; 180/89 A; 92/110, 130 C; 292/144, 201

[56] References Cited

UNITED STATES PATENTS

| | | | |
|---|---|---|---|
| 2,604,076 | 7/1952 | Trevaskis | 92/110 X |
| 3,497,257 | 2/1970 | Hirst | 296/35 R |
| 3,581,840 | 6/1971 | Hirst | 296/35 R |
| 3,667,566 | 6/1972 | Hopkins | 180/89 A |
| 3,751,086 | 8/1973 | Geringer | 292/144 |
| 3,973,793 | 8/1976 | Hirst | 292/144 |

Primary Examiner—Joseph F. Peters, Jr.
Assistant Examiner—R. Schrecengost
Attorney, Agent, or Firm—Lawrence E. Laubscher

[57] ABSTRACT

An improved actuator is disclosed for operating the locking pin of a tilt cab locking device to the released position against the biasing force of a spring that normally biases the locking pin toward a locked position relative to blade and blade housing members secured to the vehicle chassis and to the tilt cab, respectively. The invention is characterized in that the actuator includes a unitary housing having an outer tubular portion secured at one end to a rigid leg of the blade housing about the locking opening, a first transverse wall closing the other end of the outer tubular portion and containing a first opening, an inner tubular portion arranged in concentrically spaced relation within the outer tubular portion and secured at one end with said first transverse wall about said first opening, and a second transverse wall closing the other end of the inner tubular portion. A fluid motor contained within the inner tubular portion operates a locking rod that extends through a second opening contained in the second transverse wall, the locking rod being connected at one end to the locking pin.

8 Claims, 4 Drawing Figures

LOCKING PIN ACTUATOR MEANS FOR A TILT CAB VEHICLE

BRIEF DESCRIPTION OF THE PRIOR ART

It is well known in the patented prior art to provide means for locking the pivotally displaceable tilt cab of a motor vehicle to the vehicle chassis, as evidenced by the patents to Charles M. Hirst, Jr. U.S. Pat. Nos. 3,279,559 and 3,497,257, and Hirst et al U.S. Pat. Nos. 3,581,840, and 3,973,793 (each assigned to the same assignee as the instant invention).

In the aforementioned pending patent application, various embodiments of actuator means are disclosed for displacing a locking pin relative to aligned locking openings contained in blade and blade housing members that are connected with the vehicle tilt cab and the chassis, respectively. Although this invention functions quite well, the actuator means consists of several expensive parts that are difficult to assemble. The actuator member, spring and spring cover must be assembled to the pin housing as individual items with the spring under compression creating a potentially dangerous combination, so that if the bolts holding the spring cover to the pin housing were removed without properly securing the mechanism, the spring would cause the spring cover and the spring to fly apart in a dangerous manner.

SUMMARY OF THE INVENTION

The present invention was developed to avoid the above and other drawbacks of the known locking pin actuator means and to provide improved actuator means that are of positive-acting durable rugged construction, and in which the spring biasing means and fluid motor means are contained in protected relation within a unitary actuator housing. According to the improved design of the present invention, the actuator means is less costly to produce and consists of a reduced number of parts that are readily assembled, and safely disassembled if the need should occur.

Accordingly, a primary object of the present invention is to provide improved locking pin actuator means for a tilt cab vehicle, including a unitary actuator housing which contains the spring means which bias the locking pin toward the locking position relative to locking openings contained in the blade and blade housing members, an axially displaceable rod which extends through the actuator housing for connection at one end with the locking pin, and fluid motor means for displacing the rod and locking pin members toward a released position relative to the locking openings contained in the blade and blade housing members. The actuator housing includes a tubular outer portion connected at one end with the blade housing about a locking opening contained therein, a first transverse wall closing the other end of the outer tubular portion and containing a first opening, a second tubular portion arranged in concentrically spaced relation within the outer tubular portion and connected at one end with the first transverse wall about the first opening, and a second transverse wall closing the other end of the inner tubular portion. The rod extends longitudinally through the inner tubular member and is axially slidably mounted in a second opening contained in the second transverse wall. In accordance with a characterizing feature of the invention, the fluid motor means are of the piston-cylinder type and are contained totally within the inner tubular member for operating the rod and locking pin against the force of the spring biasing means.

A more specific object of the invention is to provide actuator means of the type described above, wherein the spring means comprises a coil compression spring or other spring means mounted concentrically between the tubular inner and outer portions of the unitary actuator housing. One end of the spring abuts the inner surface of the first transverse wall, and the other end of the spring engages a spring plate that is connected with the locking pin rod.

According to another object, the inner tubular portion of the unitary actuator housing defines the cylinder member of the fluid motor means for displacing the locking pin rod and the locking pin toward the released position, seal means being provided for sealing the transverse wall openings through which the locking pin rod slidably extends.

Another object of the invention is to provide locking pin actuator means that are easily assembled, less costly to produce, and readily disassembled in a safe manner.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
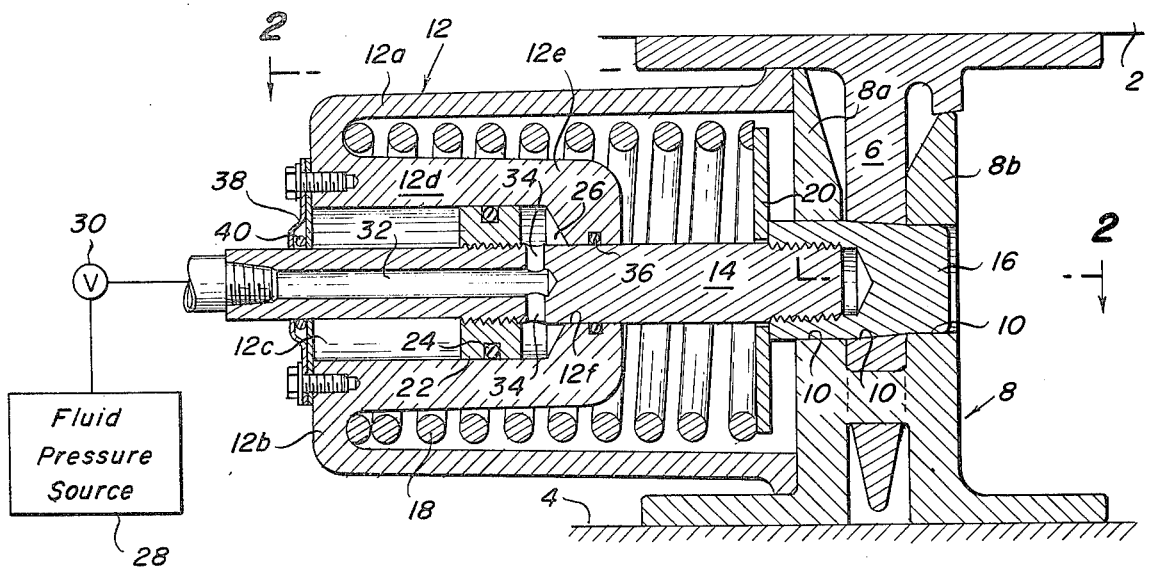
FIG. 1 is a longitudinal sectional view of the locking pin actuator means of the present invention when in the pin-locking condition.
Figure 2:
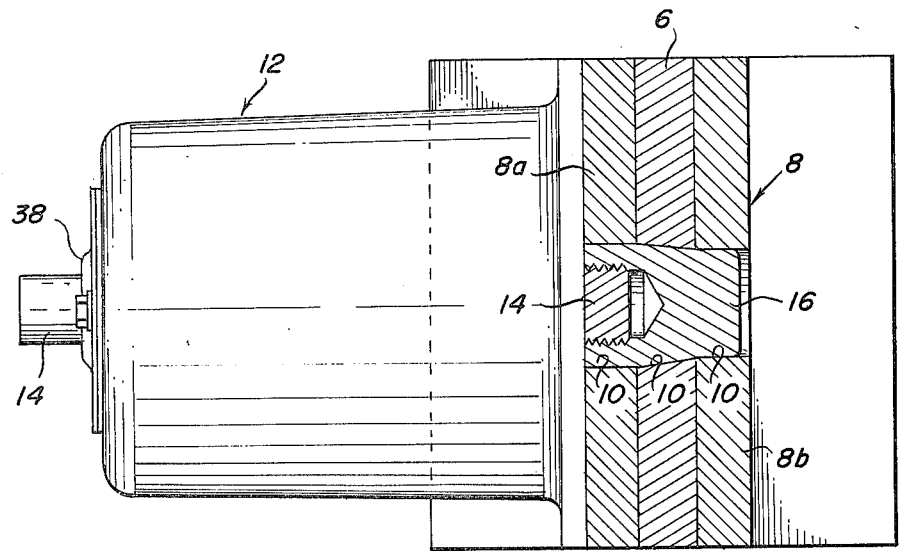
FIG. 2 is a sectional view taken along line 2—2 of FIG. 1.
Figure 3:
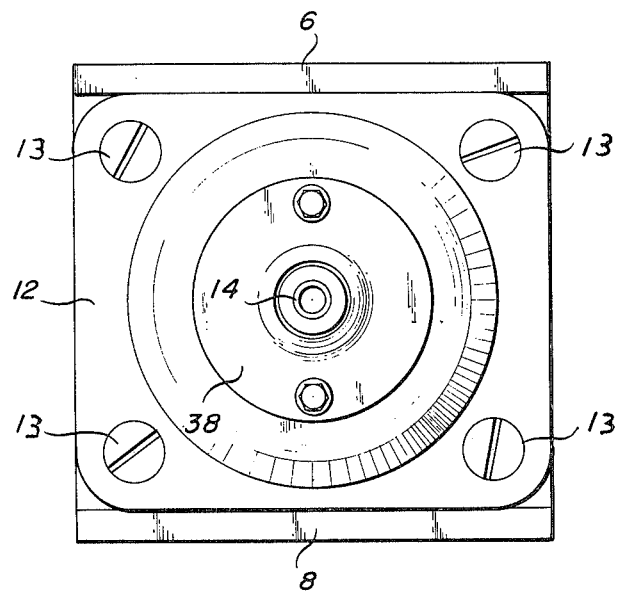
FIG. 3 is an end view of the apparatus of FIG. 1.

Referring first more particularly to FIGS. 1–3, the tilt cab locking means for locking the tilt cab 2 to the vehicle chassis 4 include a blade member 6 that extends downwardly between the parallel spaced leg portions 8a and 8b of the blade housing member 8. The blade and blade housing members are secured (for example, by bolt means) to the tilt cab and chassis members, respectively. The blade member 6 and the blade housing leg portions 8a and 8b contain locking openings 10 that are aligned when the tilt cab is in its illustrated lowered position.

In accordance with a characterizing feature of the invention, the locking pin actuator means includes a unitary housing 12 including a tubular outer portion 12a that is connected at one end (for example, by the screw means 13 of FIG. 3) with the outer surface of the leg portion 8a about the locking opening 10 contained therein. Connected with the other end of the outer tubular portion 12a is a first transverse wall portion 12b that contains a first opening 12c. The actuator housing further includes an inner tubular portion 12d that is arranged in spaced concentric relation within the outer tubular portion 12a, said inner tubular portion being connected at one end with the inner surface of the first transverse wall portion 12b. A second transverse wall portion 12e is connected with the other end of the inner tubular portion and contains a second opening 12f. Locking pin rod 14 extends longitudinally through the actuator housing 12 and through the opening 12f contained in the second transverse wall portion 12e. At one end, the rod 14 is threadably connected within a threaded bore contained in one end of the locking pin 16. Compression coil spring or other spring means mounted within the actuator housing concentrically about the inner tubular portion 12d, one end of the spring being in engagement with the inner surface of transverse wall 12b, and the other end of the spring abutting a spring plate 20 that is slidably mounted on the rod 14 for abutting engagement with the adjacent end wall of locking pin 16. Spring 18 normally biases locking pin 16 and rod 14 to the right towards the locking position of FIG. 1, wherein the locking pin 16 extends in locking engagement through the openings 10 contained in the leg porion 8a, the blade member 6, and the leg portion 8b.

Piston member 22 having peripheral seal means (such as an O-ring) is slidably mounted within the inner tubular portion 12b to define piston-cylinder fluid motor means having a working chamber 26, said piston member 22 being threadably connected with the rod 14. Fluid from fluid pressure source 28 is supplied to the working chamber 26 via control valve 30, longitudinal passage 32 contained in the other end of the rod 14, and radial ports 34. In addition to the seal means 24, the working chamber 26 is further sealed by seal means 36 contained in the second opening 12f for engagement with the peripheral surface of the rod 14. In order to prevent contamination and dirt from entering the fluid pressure motor means, seal retaining means 38 including seal means 40 are provided for closing the first opening 12c contained in first transverse wall portion 12b.

OPERATION

In operation, when the control valve 30 is closed, compression spring 18 biases locking pin 16 to the right to cause the locking pin to extend in locking engagement through the locking openings 10 as shown in FIG. 1. Owing to this illustrated locked condition, tilting movement of the tilt cab 2 relative to the vehicle chassis 4 is prevented.

Figure 4:
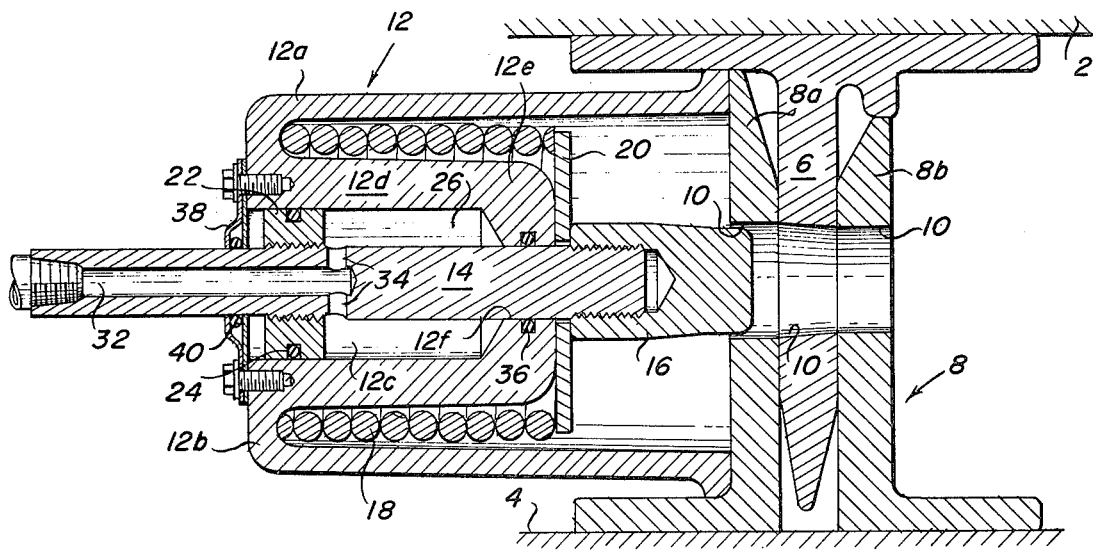
FIG. 4 illustrates the apparatus of FIG. 1 when in the pin-released condition.

In order to displace the locking pin 16 to the released position of FIG. 4, control valve 30 is opened to effect the supply of pressure fluid from source 28 to the working chamber 26 via longitudinal passage 32 contained in rod 14, and radial ports 34. Consequently, piston 22 and rod 14, together with locking pin 16, are displaced to the left to compress spring 18 and to withdraw locking pin 16 from the locking openings 10. Consequently, the blade member 6 is now released to permit upward pivotal movement of the tilt cab 2 relative to the vehicle chassis 4. Upon lowering of the tilt cab to its normal position and upon closing of the valve 30, compression spring 18 expands to shift rod 14 and locking pin 16 to the right toward the illustrated locking position of FIG. 1.

While in accordance with the provisions of the Patent Statutes, the preferred form and embodiment of this invention has been illustrated and described, it will be apparent to those skilled in the art that various modifications may be made without deviating from the inventive concepts set forth above.

What is claimed is:

1. In a tilt cab locking apparatus for releasably locking to a vehicle chassis member a pivotally connected tilt cab member, including blade and blade housing members arranged between and adapted for connection with said cab and chassis members, respectively, said blade member being normal to the cab member and said blade housing member including a pair of parallel spaced leg portions between which said blade member is received when the cab member is in its normal lowered position relative to the chassis member, said blade member and said leg portions containing aligned locking openings when the cab is in the lowered position; a locking pin arranged normal to said leg portion in coaxial alignment with said locking openings; spring means biasing the locking pin axially toward a locking position in which one extremity of said pin extends axially through the aligned locking openings; and actuator means for axially displacing said locking pin against the biasing force of said spring means toward a released position relative to said locking openings;

the improvement wherein said actuator means comprises a. a unitary actuator housing (12) including
 1. an outer tubular portion (12a) one end of which is open and adapted for rigid connection with one blade housing leg portion in contiguous engagement with the outer surface thereof about the locking opening contained therein;
 2. a first transverse wall portion (12b) connected with the other end of said tubular portion, said first wall portion containing a first opening (12c) aligned with said locking openings;
 3. an inner tubular portion (12d) arranged in concentrically spaced relation within said outer tubular portion and connected at one end with the inner surface of said first transverse wall portion about said first opening contained therein; and
 4. a second transverse wall portion (12e) connected at the other end of said inner tubular wall portion adjacent said blade housing member, said second transverse wall portion containing a second opening (12f) aligned with said first opening and with said locking openings;
 5. said inner and outer tubular portions and said first and second transverse wall portions being integral;
 6. said spring means comprising a helical spring arranged concentrically between said inner and outer tubular portions and in abutting engagement at one end with said first transverse wall portion;
b. an axially displaceable rod (14) extending longitudinally in concentrically spaced relation through said actuator housing inner tubular portion and through said second opening, one end of said rod being connected with said locking pin for axially displacing said pin relative to the locking openings; and
c. piston-cylinder motor means contained within said inner tubular portion for axially displacing said locking pin against the biasing force of said spring means toward the released position relative to said locking openings, said inner tubular portion defining the cylinder of said piston-cylinder motor means, the piston (22) of said motor means being connected with said rod to define a working chamber (26) arranged between said piston and said second transverse wall when said locking pin and said rod are in the locking position relative to said locking openings, and further including means for supplying pressure fluid to said working chamber to axially displace said piston and said rod toward the released position relative to the locking openings.

2. Apparatus as defined in claim 1, wherein said fluid supply means comprises a longitudinal passage contained within and extending from the other end of said rod, and radial ports contained in said rod for affording communication between one end of said passage and said working chamber, and further including a source of pressure fluid connected with the other end of said longitudinal passage.

3. Apparatus as defined in claim 2, and further including first seal means (36) for sealing the space between said rod and said second opening in said second transverse wall.

4. Apparatus as defined in claim 3, and further including second seal means (24) for sealing the space between said piston and said housing inner tubular portion.

5. Apparatus as defined in claim 4, and further including third seal means (40) for sealing the space between said rod and said first opening contained in said first transverse wall.

6. Apparatus as defined in claim 1, and further including a spring plate (20) mounted on said rod adjacent said locking pin, the other end of said spring being in abutting engagement with said spring plate.

7. Apparatus as defined in claim 6, wherein said locking pin contains at one end adjacent said rod a threaded axial bore receiving and threadably connected with said one rod end, said spring plate being concentrically mounted on said rod in abutting engagement with said one locking pin end.

8. In a tilt cab locking apparatus for releasably locking to a vehicle chassis member a pivotally connected tilt cab member, including blade and blade housing members arranged between and adapted for connection with said cab and chassis members, respectively, said blade member being normal to the cab member and said blade housing member including a pair of parallel spaced leg portions between which said blade member is received when the cab member is in its normal lowered position relative to the chassis member, said blade member and said leg portions containing aligned locking openings when the cab is in the lowered position; a locking pin arranged normal to said leg portion in coaxial alignment with said locking openings; spring means biasing the locking pin axially toward a locking position in which one extremity of said pin extends axially through the aligned locking openings; and actuator means for axially displacing said locking pin against the biasing force of said spring means toward a released position relative to said locking openings;

the improvement wherein said actuator means comprises a. a unitary actuator housing including
1. an outer tubular portion one end of which is open and adapted for rigid connection with one blade housing leg portion in contiguous engagement with the outer surface thereof about the locking opening contained therein:
2. a first transverse wall portion connected with the other end of said tubular portion, said first wall portion containing a first opening;
3. an inner tubular portion arranged in concentrically spaced relation within said outer tubular portion and connected at one end with the inner surface of said first transverse wall portion about said first opening contained therein, said inner tubular portion defining the cylinder of said piston-cylinder motor means, said piston being connected with said rod to define a working chamber between said piston and said second transverse wall when said locking pin and said rod are in the locking position relative to said locking openings, and further including means for supplying pressure fluid to said working chamber to axially displace said piston and said rod toward the released position relative to the locking openings; and
4. a second transverse wall portion connected at the other end of said inner tubular wall portion, said second transverse wall portion containing a second opening;

b. an axially displaceable rod extending longitudinally in concentrically spaced relation through said actuator housing inner tubular portion and through said second opening, one end of said rod being connected with said locking pin for axially displacing the pin relative to the locking openings; and c. piston cylinder motor means contained within said inner tubular portion for axially displacing said locking pin against the biasing force of said spring means toward the released position relative to said locking openings, said fluid motor means including
1. a piston secured to said rod; and
2. fluid supply means comprising a longitudinal passage contained within and extending from the other end of said rod, and radial posts contained in said rod for affording communication between one end of said passage and said working chamber, and further including a source of pressure fluid connected with the other end of said longitudinal passage.

* * * * *